Nov. 11, 1969  F. P. BRILANDO  3,477,303
DOUBLE PLATEAU SPROCKET ASSEMBLY
Filed Nov. 28, 1967
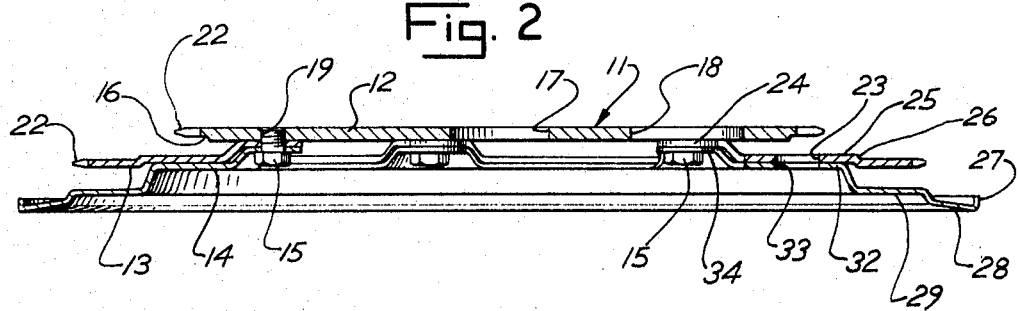
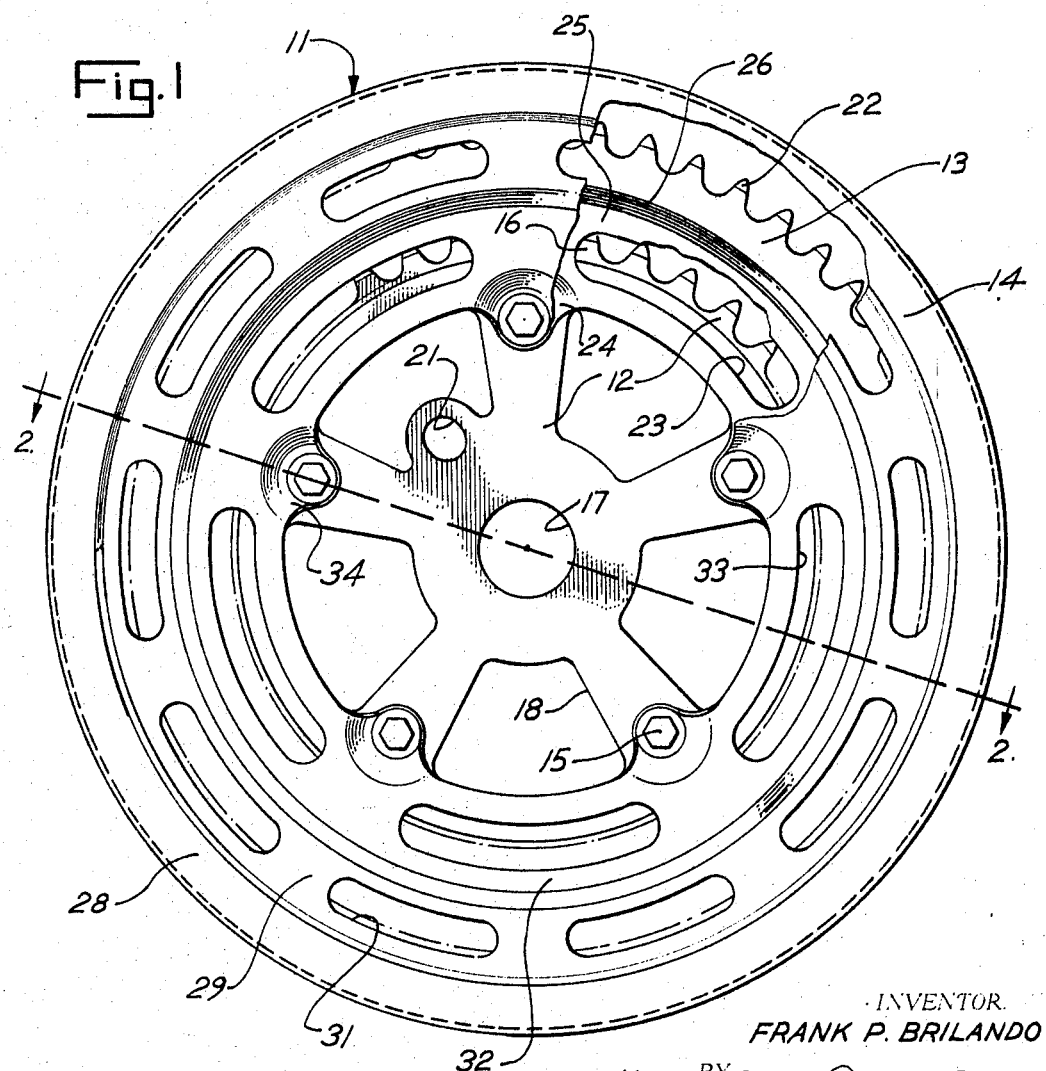
INVENTOR.
FRANK P. BRILANDO
ATTORNEYS page 1 …

United States Patent Office 3,477,303
Patented Nov. 11, 1969

3,477,303
DOUBLE PLATEAU SPROCKET ASSEMBLY
Frank P. Brilando, Niles, Ill., assignor to Schwinn Bicycle Company, Chicago, Ill., a corporation of Illinois
Filed Nov. 28, 1967, Ser. No. 686,062
Int. Cl. F16h 55/30
U.S. Cl. 74—243   5 Claims

ABSTRACT OF THE DISCLOSURE

Assembly of two sprockets and chain guard stamped from thin stock to eliminate milling of sprocket teeth, and offset for strengthening, to provide guide for movements of chain from one sprocket to other, and to form tangs offset to avoid use of separate spacers.

BACKGROUND OF THE INVENTION

Generally similar double plateau derailleur sprockets have employed fairly heavy guage stock and separate spacers between the sprockets, with the sprocket teeth being required to be milled down to the proper thickness to accommodate the chains with which they are used.

SUMMARY OF THE INVENTION

This invention provides an improved double plateau derailleur sprocket assembly which functions more smoothly and better than those of the prior art, particularly in guiding movements of the chain from one sprocket to the other to effect shifting or speed changes, and which is lighter in weight and considerably cheaper to make, since it eliminates the previously employed spacers between the sprockets and the relatively expensive machining step of milling the sprocket teeth to the desired thickness. These results are accomplished by using stock for the larger sprocket of an initial thickness substantially the same as that required for the base of the teeth, which is less than the inner width of the tooth-receiving apertures of the drive chain with which the sprocket is to be employed, and offsetting the body portion of the sprocket during the sprocket forming stamping operation to provide the requisite strength, novel guide means for assuring smooth, trouble-free movements of the chain from one sprocket to the other, and proper spacing between the sprockets. The latter is established by annularly spaced tangs offset inwardly from the main body portions of the larger sprocket and an outer chain guard, and this further results in the head portions of bolts which extend through the tangs for securing the assembly together, being disposed inwardly of the outer surface of the adjacent main body portion of the chain guard, instead of dangerously protruding outwardly therefrom.

DESCRIPTION OF THE PREFERRED EMBODIMENT

In the drawings:
FIGURE 1 is an elevational view of a double plateau sprocket assembly embodying the features of the invention, as seen from the outer side thereof and with most of the sprocket teeth represented diagrammatically, and
FIG. 2 is a transverse section taken substantially on the line 2—2 of FIG. 1.

Referring more particularly to the drawings, reference numeral 11 indicates in general a double plateau sprocket assembly embodying the features of this invention which includes an inner or smaller sprocket 12, an outer or larger sprocket 13 and a chain guard 14 on the outer side thereof, with these three parts being secured together by means of a plurality of bolts 15. In the specific embodiment illustrated, the inner sprocket 12 is formed with thirty-nine teeth and the outer sprocket 13 with fifty-two teeth, it being understood that the specific form or conformaion of the teeth on the two sprockets is the same and is dictated by the particular design of the chain (not shown) with which this assembly is intended to be employed.

The inner or smaller sprocket 12 is formed in a single stamping operation from a blank of suitable material somewhat thicker than the desired thickness of the base portion of the teeth, and this stamping operation, in addition to blanking out the teeth, at the same time decreases the thickness of that portion of the blank defining the teeth, as indicated at 16 in FIG. 2. This stamping operation also punches a plurality of apertures in the sprocket blank to provide a central bore 17, a plurality of spoke-defining, segmental apertures 18, circular apertures 19 (FIG. 2) spaced between the apertures 18, and a single crank aperture 21 (FIG. 1) which is adapted to be engaged by a stud, or the like, on the crank arm (not shown) of the pedal assembly in well-known manner. To complete the smaller sprocket 12, the tips of the teeth are coined in the usual manner, as indicated at 22 in FIG. 2, and the apertures 19 are tapped to receive the bolts 15. In the specific embodiment illustrated, the thickness of the blank employed and of the main body portion of the smaller sprocket 12 is .114 of an inch and the thickness of the main body portions of the teeth is .088 of an inch.

The latter dimension is substantially the same as the thickness of the blank employed to form the larger sprocket 13, with .087 of an inch being the preferred thickness thereof in the instant embodiment. This larger sprocket 13 also is formed from such a blank in a single stamping operation which punches the blank out to define the sprocket teeth, a plurality of radially spaced, annular or segmental apertures 23 (FIG. 1) and a central aperture, with the peripheral edge of the latter formed to define a plurality of radially spaced tangs 24 (FIG. 2) between adjacent apertures 23. The main body portion 25 of this larger sprocket 13 at the same time is displaced or offset laterally from the original plane of the blank defined by the tangs 24, as shown in FIG. 2, and the peripheral portion of the blank defining the sprocket teeth is further offset outwardly to provide a curved or sloping annular surface 26 adapted to function as a guide means for the chain with which the sprocket assembly is used to assure smooth transfer movements of the chain into and out of engagement with the teeth of the sprockets 12 and 13. This stamping or sprocket-forming operation also punches central apertures in each of the tangs 24 to slidingly receive the bolts 15. After the sprocket 13 has been so formed, the tips of the teeth are coined, as indicated at 22 in FIG. 2, in the same manner as the corresponding final forming of the teeth on the smaller sprocket 12.

In addition to the chain-guiding function of the sloping annular surface 26, such offsetting of the outer peripheral portion of the larger sprocket 13 materially strengthens the latter, as does the offsetting of the tangs 24. As best seen in FIG. 2, this lateral offsetting of the tangs also accurately establishes the proper lateral relationship between the teeth of the two sprockets 12 and 13 and completely eliminates the necessity of employing the separate spacers used in the prior art devices to assure the proper lateral relationship of the sprockets.

The chain guard 14 also is formed in a single stamping operation from a relatively thin blank. In the specific embodiment illustrated, the material of this blank is .032 of an inch thick. This single stamping operation forms a peripheral flange 27 (FIG. 2), an outer annular rim portion 28, an intermediate offset annular portion 29 having spaced apertures 31 therein, a further inwardly offset main body portion 32 having spaced apertures 33 substantially coinciding, when assembled, with the apertures 23 of the larger sprocket 13, and a central aperture having a peripheral edge formed to define further inwardly offset tangs 34 arranged similarly to the tangs 24 on the sprocket 13 and adapted to nest therein when the several parts are assembled together. Like the tangs 24, these tangs 34 of the chain guard 14 are centrally apertured to receive the bolts 15. As best seen in FIG. 2, when the members 12, 13 and 14 are secured together by the bolts 15, the offset arrangement of the tangs 24 and 34 is such that the heads of the bolts 15 lie rearwardly or inwardly of the outer surface of the main body portion 32 of the chain guard, instead of dangerously protruding outwardly therefrom.

It is thought that the invention and many of the attendant advantages will be understood from the foregoing description, and it will be apparent that various changes may be made in the form, constructions, and arrangement of the parts without departing from the spirit and scope of the invention or sacrificing all of its material advantages, the form hereinbefore described being merely a preferred embodiment thereof.

I claim:

1. A double plateau sprocket assembly for use with a drive chain, comprising a first sprocket, and a larger second sprocket having peripherally disposed teeth and a body portion of substantially the same thickness as the base of said teeth integral therewith and laterally offset therefrom inwardly toward said first sprocket to provide guide means to assure smooth transfer movements of said chain into and out of engagement with said teeth, said body portion being further offset inwardly to provide laterally disposed spacer tangs.

2. A sprocket assembly according to claim 1, wherein said second sprocket has circumferentially spaced tapped apertures, and bolt means cooperating with said apertures and said spacer tangs for securing said sprockets together.

3. In a sprocket assembly according to claim 2, a chain guard having circumferentially spaced tangs cooperating with said spacer tangs and said bolt means to secure said chain guard to said sprockets.

4. A sprocket assembly according to claim 3, wherein said bolt means comprises bolts with head portions, and said chain guard tangs are laterally offset inwardly from the main body of said chain guard to so receive said bolt head portions that the outer ends thereof in assembled positon are disposed inwardly of the outer surface of said main body.

5. A double plateau sprocket assembly for use with a drive chain, comprising a first sprocket, and larger second sprocket having peripherally disposed teeth and a body portion of substantially the same thickness as the base of said teeth integral therewith and laterally offset therefrom inwardly toward said first sprocket to provide guide means to assure smooth transfer movements of said chain into and out of engagement with said teeth, a chain guard disposed laterally outwardly adjacent said second sprocket, with said body portion of the second said sprocket being offset inwardly to provide means for effecting proper spacing between said sprockets, wherein said chain guard is laterally offset inwardly to provide circumferentially spaced tangs, and bolt means for securing said tangs and said sprockets together.

References Cited

UNITED STATES PATENTS

| | | | |
|---|---|---|---|
| 504,121 | 8/1893 | Cheesman | 74—611 |
| 600,911 | 3/1898 | Frost | 74—611 |

FOREIGN PATENTS

| | | |
|---|---|---|
| 641,308 | 8/1950 | Great Britain. |
| 662,068 | 11/1951 | Great Britain. |

FRED C. MATTERN, Jr., Primary Examiner

J. A. WONG, Assistant Examiner

U.S. Cl. X.R.

74—240, 611